United States Patent
Li et al.

(10) Patent No.: US 7,804,800 B2
(45) Date of Patent: Sep. 28, 2010

(54) EFFICIENT TRAINING SCHEMES FOR MIMO BASED WIRELESS NETWORKS

(75) Inventors: Qinghua Li, Sunnyvale, CA (US); Xintian E. Lin, Mountain View, CA (US); Adrian P. Stephens, Cambridge (GB); Keith Holt, El Dorado Hills, CA (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 11/395,363

(22) Filed: Mar. 31, 2006

(65) Prior Publication Data
US 2007/0230373 A1 Oct. 4, 2007

(51) Int. Cl.
*H04W 4/00* (2009.01)
(52) U.S. Cl. .................................. 370/334; 455/13.3
(58) Field of Classification Search ............... 370/436, 370/346
See application file for complete search history.

(56) References Cited

U.S. PATENT DOCUMENTS

| | | | |
|---|---|---|---|
| 7,006,848 B2 | 2/2006 | Ling et al. | |
| 2003/0103521 A1* | 6/2003 | Raphaeli et al. | 370/445 |
| 2005/0157695 A1 | 7/2005 | Stephens et al. | |
| 2006/0221928 A1* | 10/2006 | Sharony | 370/347 |
| 2007/0117590 A1* | 5/2007 | Aldana | 455/562.1 |
| 2007/0124443 A1* | 5/2007 | Nanda et al. | 709/223 |
| 2007/0218952 A1* | 9/2007 | Koo et al. | 455/562.1 |
| 2007/0265014 A1* | 11/2007 | Tiedemann et al. | 455/450 |

FOREIGN PATENT DOCUMENTS

| | | |
|---|---|---|
| WO | WO-02078211 A2 | 10/2002 |
| WO | WO-02093784 A1 | 11/2002 |
| WO | WO-03071711 A2 | 8/2003 |
| WO | WO-2005/053235 | 6/2005 |

OTHER PUBLICATIONS

"International Search Report and Written Opinion", PCT/US2007/064733, (Aug. 21, 2007), 1-12.

* cited by examiner

*Primary Examiner*—Rafael Pérez-Gutiérrez
*Assistant Examiner*—Marcos Batista
(74) *Attorney, Agent, or Firm*—Thorpe North & Western LLP (57) ABSTRACT

Schemes are disclosed for efficiently training MIMO channels in wireless networks. In at least one embodiment, multiple STAs in a network may share a single channel sounding packet to develop corresponding beamforming matrices or CSI.

20 Claims, 8 Drawing Sheets

Fig. 10

EFFICIENT TRAINING SCHEMES FOR MIMO BASED WIRELESS NETWORKS

TECHNICAL FIELD

The invention relates generally to wireless communication and, more particularly, to wireless networking.

BACKGROUND OF THE INVENTION

Multiple input, multiple output (MIMO) is a wireless communication technique that uses multiple antennas at each end of a communication channel. That is, a transmitting device uses multiple transmit antennas to transmit signals into one end of the wireless channel and a receiving device uses multiple receive antennas to receive the signals at the another end of the wireless channel. By using multiple antennas at each side of the channel, the spatial dimension can be taken advantage of in a manner that improves overall communication performance. MIMO can be implemented as an open loop or a closed loop technique. In open loop MIMO, a transmitting device does not have any knowledge of the state of the channel before transmitting a signal into the channel. In closed loop MIMO, on the other hand, the transmitting device acquires and uses channel related information (e.g., a beamforming matrix, etc.) to precondition signals before transmitting them into the channel. Techniques are needed for efficiently training MIMO channels during closed loop MIMO operations.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures for implementing closed loop multiple input, multiple output (MIMO) in a wireless network. Closed loop MIMO may be practiced using either implicit feedback or explicit feedback. Implicit feedback relies on the property of channel reciprocity to obtain information about a MIMO channel within a transmitting device. Implicit feedback requires calibrations to be performed for the transmitting device and the receiving device to accurately model the overall channel as a reciprocal component. After calibrations have been accomplished, training symbols may be transmitted from the receiving device to the transmitting device (i.e., in the reverse direction) to allow the transmitting device to calculate a beamforming matrix for use in transmitting data to the receiving device. The reciprocal property of the channel allows the transmitting device to calculate a channel matrix for the forward direction channel from channel information observed for the reverse direction channel.

Explicit feedback scheme transmits training symbols in the forward direction from the transmitting device to the receiving device. The beamforming matrix may then be developed in the receiving device and transmitted back to the transmitting device to be used in generating subsequent transmit signals. When explicit feedback is used, complicated system calibrations are not required. The present invention presents various training procedures that may be used to implement closed loop MIMO using explicit or implicit feedback techniques. These training procedures may be used within, for example, high throughput wireless networks (e.g., the IEEE 802.11n high throughput wireless networking standard, etc.) to provide highly reliable, high throughput operation with relatively low overhead.

Figure 1:
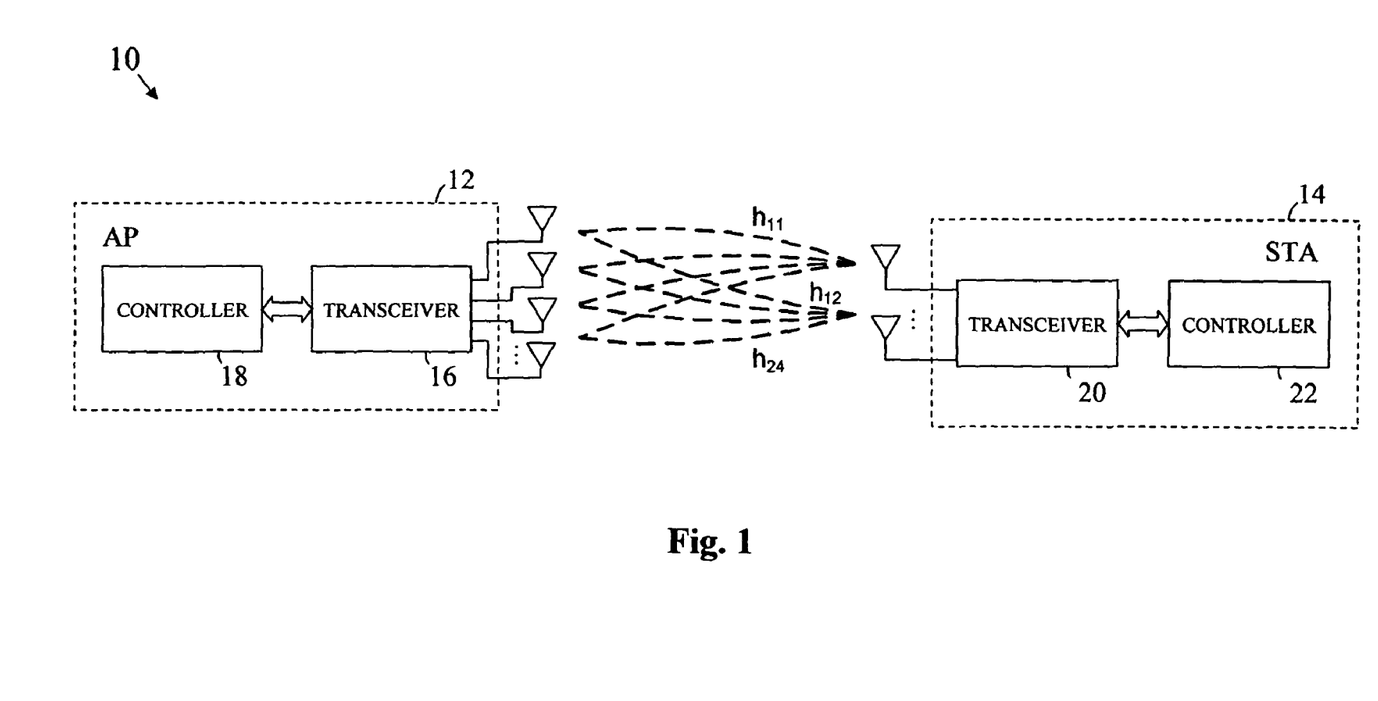
FIG. 1 is a block diagram illustrating an example wireless networking arrangement in accordance with an embodiment of the present invention.

FIG. 1 is a block diagram illustrating an example wireless networking arrangement 10 in accordance with an embodiment of the present invention. As illustrated, a wireless access point (AP) 12 is communicating with a wireless station (STA) 14 via a wireless communication channel. The wireless AP 12 may be providing access to a larger network (wired and/or wireless) for the STA 14. The STA 14 may include any type of wireless component, device, or system that is capable of accessing a network through a remote wireless access point. Although only a single STA is shown in FIG. 1, it should be appreciated that the wireless AP 12 may be capable of providing access services for multiple STAs simultaneously. As illustrated, the wireless AP 12 and the STA 14 each have multiple (i.e., two or more) antennas. The wireless channel between the AP 12 and the STA 14 is a multiple input, multiple output (MIMO) channel. In the illustrated embodiment, the AP 12 and the STA 14 each have a single set of antennas that may be used for both transmit and receive functions. In other embodiments, the AP 12 and/or the STA 14 may use a different set of antennas for transmit and receive. Any type of antennas may be used including, for example, dipoles, patches, helical antennas, and/or others.

In the embodiment of FIG. 1, the wireless AP 12 includes a wireless transceiver 16 and a controller 18. The controller 18 is operative for carrying out some or all of the digital processing functions required to support closed loop MIMO operation for the AP 12. The controller functions may be carried out using, among other things, one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. In some embodiments, the controller 18 may also include one or more discrete digital elements such as, for example, bit interleavers, bit de-interleavers, modulation units, demodulation units, discrete Fourier transform units, inverse discrete Fourier transform units, etc. The wireless transceiver 16 is operative for performing the radio frequency (RF) related functions required to (a) generate RF transmit signals for delivery to the multiple antennas during transmit operations and (b) process the RF signals received by the multiple antennas during receive operations. The STA 14 of FIG. 1 also includes a wireless transceiver 20 and a controller 22. These elements will perform functions similar to the corresponding units within the AP 12 (although the AP will typically be capable of supporting multiple simultaneous wireless connections while the STA may only be capable on supporting one).

In at least one embodiment, the AP 12 and the STA 14 may use orthogonal frequency division multiplexing (OFDM) techniques (or other multicarrier techniques). In an OFDM system, data to be transmitted is distributed among a plurality of substantially orthogonal, narrowband subcarriers. The AP 12 and the STA 14 may also implement a form of MIMO known as SVD (i.e., singular value decomposition) MIMO. SVD MIMO will be discussed in greater detail below. Other types of transmit beamforming, such as zero-forcing, can also (or alternatively) be used. To facilitate understanding and simplify notation, the discussion that follows may be with respect to a single subcarrier in an OFDM system. It should be appreciated, however, that the below described functions may need to be performed for each of the subcarriers within a multi-carrier system. Interpolation between subcarriers may also be used to reduce the amount of calculation and feedback.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = UDV^H$$

where U and V are unitary matrices (i.e., matrices with orthonormal columns and unit column norm), D is a diagonal matrix, and $V^H$ is the Hermitian of unitary matrix V. A unitary matrix U has the following property:

$$U^H U = I$$

where I is the identity matrix. In the channel matrix decomposition set out above, the matrix V may be referred to as the beamforming matrix (precoder). This beamforming matrix V may be generated in a receiving device by first determining the channel matrix H (using, for example, received channel sounding symbols) and then decomposing the matrix H using SVD techniques (or other similar techniques). The beamforming matrix V (or a compressed version thereof) may then be transmitted back to the transmitting device to be used in the generation of a future data transmit signal. A separate matrix V may be required for each subcarrier in a multicarrier system.

Instead of using SVD techniques, other techniques may be used to compute the beamforming matrix in the receiving device. For example, both the receiver and the transmitter may store a predetermined set of beamforming matrices. The receiver searches for the optimal beamforming matrix within the set. It may first multiply a beamforming matrix in the set with the channel matrix H to emulate a beamformed MIMO channel, and then the receiver may compute the received signal quality of this beamformed channel. By comparing the signal quality associated with the beamforming matrices in the set, the receiver can identify the optimal (or a suboptimal) beamforming matrix in the set and feed the index of the matrix in the set back to the transmitter. The beamforming matrix can then be obtained by the transmitter, which stores the same set as the receiver, using the index. The present invention is not limited to any particular method for developing the beamforming matrix.

The elements of the diagonal matrix D are known as the singular values of the channel matrix H. The beamforming matrix V is made up of a number of column vectors, known as singular vectors, that correspond to the singular values. Each of the singular vectors may define a spatial channel within the MIMO channel. The stream of data flowing through a particular spatial channel is known as a spatial stream. The singular values will typically be indicative of the relative strength of the corresponding spatial channels. Sometimes, it may be advantageous to limit a MIMO channel to only the strongest of the available spatial channels (e.g., to the spatial channels associated with the 2 largest singular values). This may, for example, reduce the overall amount of feedback to be delivered to the transmitting device and improve the transmission power efficiency by sending power only over high quality channels.

Figure 2:
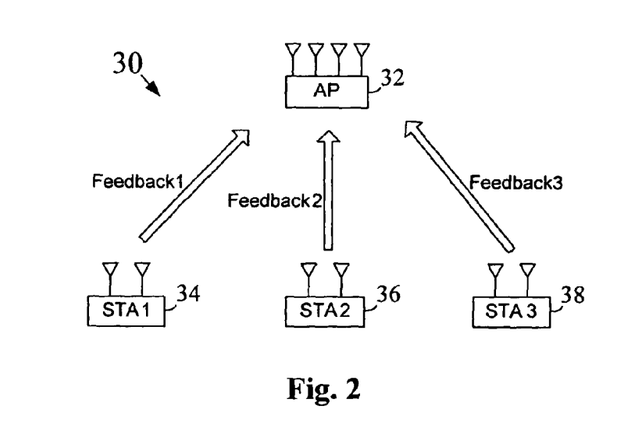
FIG. 2 is a diagram illustrating an example wireless network scenario using explicit feedback in accordance with an embodiment of the present invention.

In a typical high throughput wireless network scenario, an AP may be servicing a large number of wireless users within a basic service area of the AP simultaneously. At any one time, the wireless AP may have data buffered for delivery to multiple different STAs within the basic service area. In one aspect of the present invention, procedures are provided for efficiently managing channel training in a wireless network between an AP and multiple different STAs in a basic service area. FIG. 2 is a diagram illustrating an example wireless network scenario 30 using explicit feedback in accordance with an embodiment of the present invention. As shown, the wireless network scenario 30 includes an AP 32 that is operative for providing wireless network access services for STAs within a corresponding basic service set (BSS). The AP 32 first acquires the wireless channel for transmission and then selects a number of STAs 34, 36, 38 from the BSS to receive data transmissions from the AP 32. Any number of STAs may be selected. The AP 32 may select STAs based on any number of different factors including, for example, an amount of data buffered for the STA, the length of time data has been buffered for the STA, a priority level of the STA, the length of a corresponding transmit opportunity (TXOP), and/or others factors. At least AP 32 includes multiple antennas.

Before the AP 32 transmits data to any of the STAs 34, 36, 38, channel training is to be performed to develop channel knowledge within the AP 32. As described previously, for closed loop MIMO, the channel training is usually performed to develop a beamforming matrix that can be used to tailor a data transmission to the particular channel it will be propagating through. As the AP 32 will be transmitting data to each of the STAs 34, 36, 38, a separate beamforming matrix is needed for each STA. In addition, if multicarrier communication is being used, a separate beamforming matrix may be needed for each sub-carrier of the multicarrier signal, for each STA.

Figure 3:
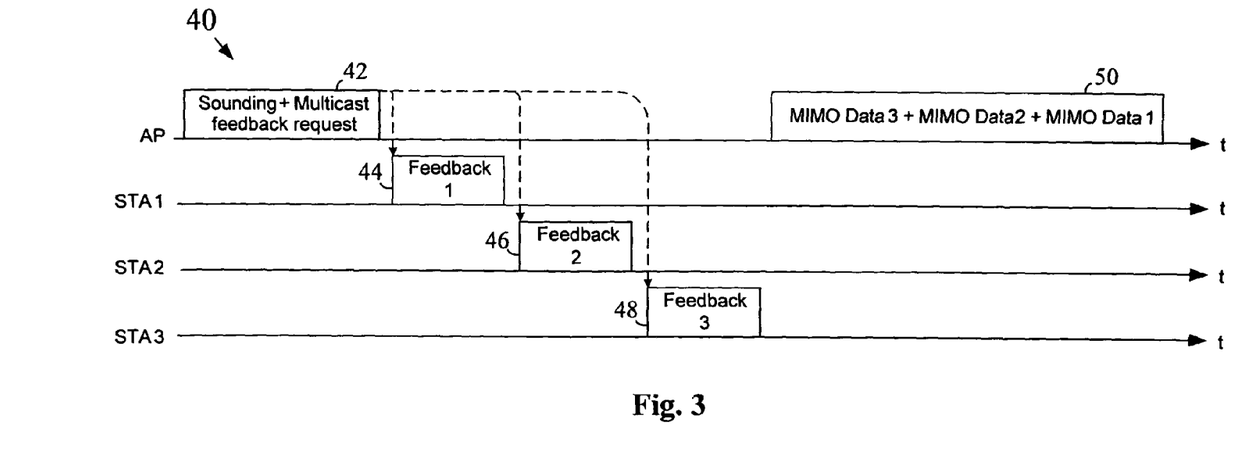
FIG. 3 is a timing diagram illustrating an example packet exchange sequence for use in performing downlink sounding for multiple STAs in a MIMO based wireless network using explicit feedback in accordance with an embodiment of the present invention.

FIG. 3 is a timing diagram illustrating an example packet exchange sequence 40 for use in performing training for multiple STAs in a MIMO based wireless network using explicit feedback in accordance with an embodiment of the present invention. The packet exchange sequence 40 may be referred to as "explicit sounding." The packet exchange sequence 40 will be described with reference to the wireless network scenario 30 of FIG. 2. As shown in FIG. 3, after the AP 32 has selected the STAs 34,36, 38 that will be receiving data, the AP 32 transmits a sounding packet 42 to the STAs. The sounding packet 42 may include sounding symbols that can be used by a STA to develop a channel matrix for the channel between the AP and the STA. The sounding packet 42 may also comprise a multicast feedback request that includes identification information identifying the selected STAs 34, 36, 38.

Each of the selected STAs 34, 36, 38 receives the sounding packet 42 and determines that the corresponding feedback request is directed to it. The STAs 34, 36, 38 then each use the sounding symbols within the sounding packet 42 to generate a beamforming matrix for use by the AP 32 to transmit data to the STA (or multiple beamforming matrices in a multicarrier environment). Each of the STAs 34, 36, 38 then delivers a feedback packet that includes a corresponding beamforming matrix (matrices) to the AP 32. The beamforming matrix (matrices) may be compressed or uncompressed before transmission. In addition to the beamforming matrix, a STA may also include an MCS recommendation within the feedback packet that recommends an MCS for the AP to use to transmit data to the STA. Such a recommendation, if present, may not be binding upon the AP.

Instead of the beamforming matrix, other information may be included in the feedback packet that can be used to calculate the beamforming matrix. For example, in at least one approach, the channel matrix itself is included in the feedback packet and the AP may use the channel matrix to calculate the SVD. Partial information may also be used instead of the full channel matrix. In at least one embodiment, the best antenna index is used.

In at least one embodiment of the invention, the sounding packet 42 may also include ordering information (e.g., as part of the multicast feedback request) that indicates an order in which the selected STAs 34, 36, 38 are to transmit feedback packets to the AP 32. As shown in FIG. 3, for example, the sounding packet 42 may include ordering information that indicates that STA1 is to transmit a feedback packet 44 first, STA2 is to transmit a feedback packet 46 second, and STA3 is to transmit a feedback packet 48 third. The order information of the sounding packet 42 may include just the order of the requested feedback or it may identify the delay offset of each requested feedback packet. If only the order is specified, a STA may monitor the transmissions of the STAs preceding it in the order and then transmit after the end of the transmission of the immediately preceding STA. If the immediately preceding STA does not transmit for some reason, the STA may transmit when a time out condition occurs. The sounding packet 42 may also include an indication of the modulation and coding scheme (MCS) that the AP should use.

After all of the feedback packets 44, 46, 48 have been received by the AP, the AP determines a transmission order for the data to be transmitted. In at least one embodiment, the transmission order is determined based on, for example, the amount of data to be transmitted to each STA and the channel variation speed associated with each STA. Other techniques for determining the transmission order may alternatively be used. After the transmission order has been determined, the AP transmits the data 50 using the beamforming matrix information. If the beamforming matrices were compressed before being transmitted to the AP, then they should be reconstructed after receipt.

Figure 4:
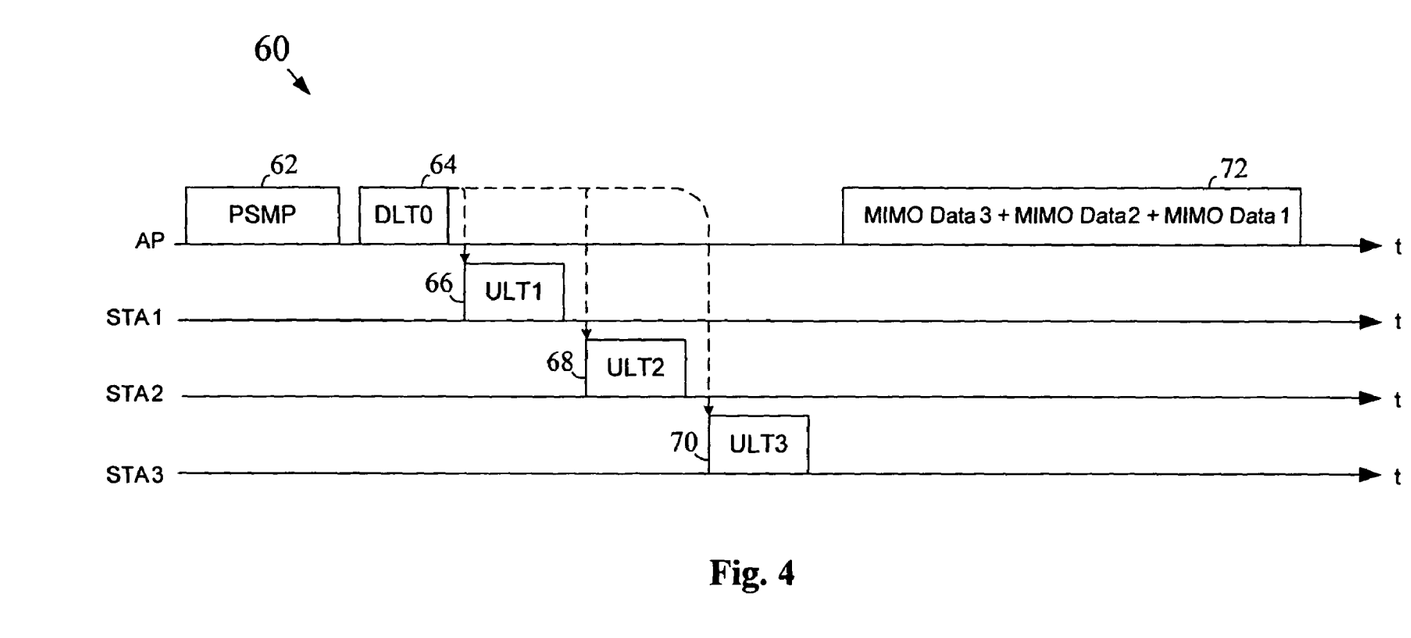
FIG. 4 is a timing diagram illustrating another example packet exchange sequence for use in performing training for multiple STAs in a MIMO based wireless network using explicit feedback in accordance with an embodiment of the present invention.

FIG. 4 is a timing diagram illustrating another example packet exchange sequence 60 for use in performing training for multiple STAs in a MIMO based wireless network using explicit feedback in accordance with an embodiment of the present invention. The sequence 60 is an example of the Power Save Multiple-Poll (PSMP) concept outlined in the IEEE 802.11 TGn proposal entitled "Joint Proposal: High Throughput Extension to the 802.11 Standard: MAC," prepared by Adrian Stephens, Dec. 15, 2005. As shown, a PSMP packet 62 is first transmitted that includes parameters that define the STA IDs and the time offsets of downlink transmission (DLT) 64, duration of the DLT 64, timing offsets of the uplink transmissions (ULT) 66, 68, 70, and durations of ULT 66, 68, 70 for each STA. The PSMP packet 62 may schedule a DLTO 64 with a special STA ID (AID) for channel sounding and multiple ULT 66, 68, 70 for channel state feedback. The duration of DLT1, DLT2 and DLT3 may be set to zero (null).

In the above described techniques, the channel sounding symbols that are transmitted by the AP are used by multiple different STAs in the basic service area. In this manner, a reduction in overhead is achieved over networks that transmit separate sounding information to each STA. In addition, this technique is more efficient than implicit feedback networks in which an AP transmits a multicast sounding request to multiple STAs and then receives a separate sounding packet from each STA. As sounding packets are typically larger than compressed beamforming matrix feedback, a significant overhead benefit may be achieved using the above described approach in an explicit feedback network.

In some embodiments of the invention, the training resources in the downlink traffic (e.g., the preamble, beacons, and/or pilots) are exploited as sounding for the STAs. In an IEEE 802.11n based system, the data portion in the downlink traffic can also be used as sounding as the medium access control (MAC) employs collision avoidance that requires all STAs to decode downlink packets to retrieve a network allocation vector (NAV). Once the downlink packet has been correctly decoded (e.g., the CRC check passes), the data portion of the packet can be used as pilots for channel estimation.

Figure 5:
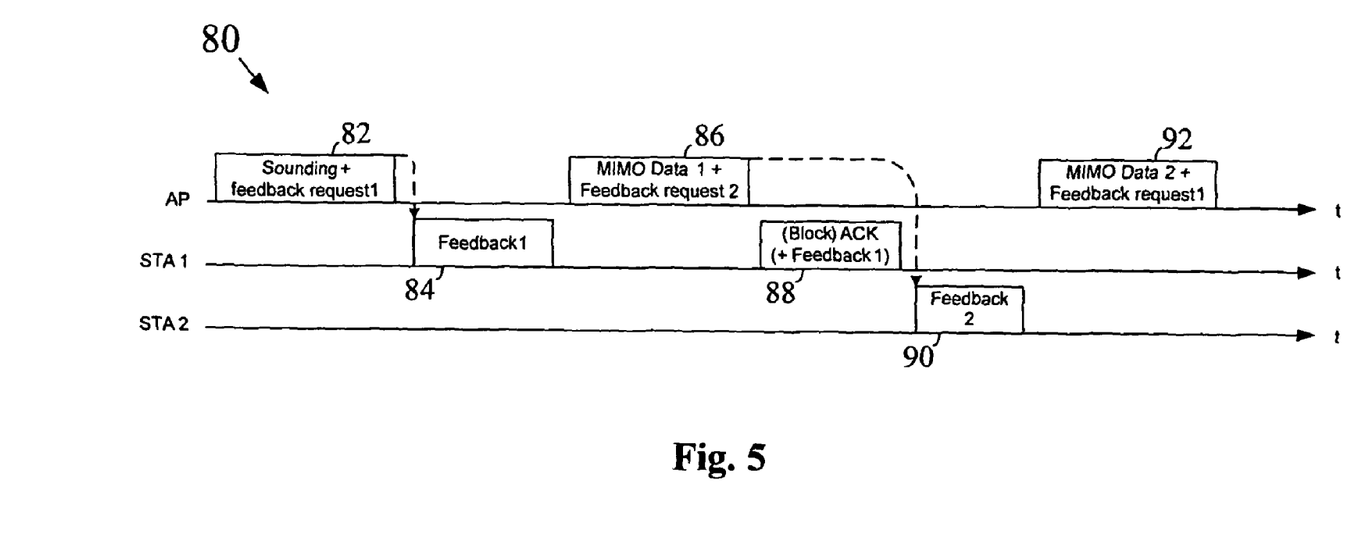
FIG. 5 is a timing diagram illustrating another example packet exchange sequence for use in performing downlink sounding for multiple STAs in a MIMO based wireless network using explicit feedback in accordance with an embodiment of the present invention.

The training packet exchange sequence 40 described above (explicit sounding) works well in networks where the channels do not change very fast. However, as the channels begin to change more rapidly, the accuracy of the beamforming of packet exchange sequence 40 may suffer. This is because the latency between the channel sounding and the actual beamforming can be large when using the packet exchange sequence 40 because of the intervening feedback for all of the selected STAs. If the latency is large and the channels are changing quickly, the beamforming information may be stale by the time it is actually used. FIG. 5 is a timing diagram illustrating another example packet exchange sequence 80 that may be used to perform training for multiple STAs in a MIMO based wireless network that can be used when channels change more rapidly in accordance with an embodiment of the present invention. The packet exchange sequence 80 is capable of reducing the latency between sounding and beamforming over the previously described technique. The packet exchange sequence 80 may be referred to as "implicit sounding." The packet exchange sequence 80 may be implemented as an alternative to the packet exchange sequence 40 of FIG. 3 or as a supplemental procedure. For example, in at least one embodiment, the packet exchange sequence 40 may be used when channels are known to be changing slowly and the packet exchange sequence 80 may be used when channels are known to be changing more rapidly. The packet exchange sequence 80 requires that the preambles or pilots in the data packet, when used as sounding, excite all of the eigenmodes at the AP.

As before, an AP first selects a number of STAs from a corresponding BSS to receive data transmissions. With reference to FIG. 5, the AP may then transmit a sounding packet 82 that includes a feedback request that identifies a first selected STA (STA1) that is to return a beamforming matrix. In one approach, the sounding packet 82 may also identify an MCS that the AP should use to transmit data. STA1 receives the sounding packet 82 and uses sounding symbols therein to generate a beamforming matrix $V_1$. STA1 then transmits a feedback packet 84 to the AP that includes the beamforming matrix $V_1$ (or a compressed version thereof). The feedback packet 84 may also include an MCS recommendation that recommends an MCS for the AP to use to transmit data to STA1. As before, such a recommendation, when made, will not typically be binding upon the AP.

The AP next uses the beamforming matrix $V_1$ to transmit a beamformed data packet 86 to STA1. In addition to data, the data packet 86 may also include a feedback request that identifies a second selected STA (STA2) that is to return a beamforming matrix. When STA1 receives the beamformed data packet 86, it may respond by transmitting an acknowledgement (ACK) packet 88 to the AP to acknowledge the successful receipt of the data packet 86. In addition, the ACK packet 88 may include an update of the beamforming matrix $V_1$. This update may be included even though no request was received from the AP for an update. This may be referred to as "parasitic feedback." When STA2 receives the beamformed data packet 86, it may use the packet to generate a beamforming matrix $V_2$ for its downlink channel. As discussed previously, the preamble, the pilots, and/or the data itself within the packet 86 may be used to generate the channel information from which the beamforming matrix $V_2$ is generated. STA2 transmits a second feedback packet 90 to the AP that includes the matrix $V_2$. The feedback request within the data packet 86 may include an offset value indicating when the second feedback packet 90 is to be transmitted. Alternatively, STA2 can simply wait for the end of the ACK packet 88 (or a time out) to make its transmission. In at least one embodiment, ACK packets are not used.

The beamforming matrix $V_2$ received by the AP was generated by STA2 using information within a beamformed packet 86. Therefore, to generate the actual beamforming matrix for the MIMO channel between the AP and STA2, $V_2$ needs to be matrix multiplied by $V_1$. The AP then uses $V_2 \times V_1$ to transmit a beamformed data packet 92 to STA2. The packet 92 includes a feedback request for STA 1. In response, STA 2 may transmit an ACK packet and STA1 may transmit a feedback packet. This process may then repeat until all desired data has been delivered. Although depicted for 2 stations, the packet exchange sequence 80 of FIG. 5 may be extended to work with any number of stations. For example, if three stations are used, data packet 92 may include a feedback request for a third STA, and so on. Because the channel sounding is closer in time to the data transfer than the previously described technique, the beamforming matrix will typically be fresher at the time of the data transfer, resulting in greater performance.

In the three packet exchange sequences discussed above, the feedback is transmitted to the AP in response to a request. If a STA knows that there is data buffered in an AP for it, however, then the STA can proactively generate and feed back a beamforming matrix to the AP, without a request. The beamforming matrix may be generated using information within downlink traffic, whether or not the downlink traffic is directed to the STA. Proactive feedback can reduce the request overhead in the network. When the AP receives the feedback, it can then compute the actual beamforming matrix for the corresponding MIMO channel by multiplying the received matrix by the previously used matrix (e.g., $V_2 \times V_1$). This technique may be useful for applications where traffic patterns are very predictable (e.g., video streaming, voice over IP, etc.).

Figure 6:
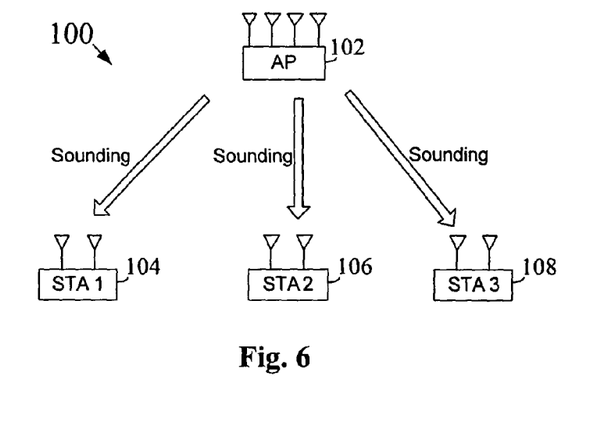
FIG. 6 is a diagram illustrating an example wireless network scenario using implicit feedback in accordance with an embodiment of the present invention.

The concept of multiple STAs sharing sounding can be extended for use in the uplink of networks practicing implicit feedback. The sounding for the uplink in implicit feedback is similar to the sounding for the downlink in explicit feedback. That is, the AP transmits the sounding. FIG. 6 is a diagram illustrating an example wireless network scenario 100 using implicit feedback in accordance with an embodiment of the present invention. As shown, during an uplink data transmission operation, an AP 102 transmits sounding to a group of selected STAs 104, 106, 108. This sounding is a single transmission that is received by all of the selected STAs. The STAs 104, 106, 108 use the sounding to generate respective beamforming matrices. The STAs 104, 106, 108 then each use a respective beamforming matrix to transmit data to the AP.

Figure 7:
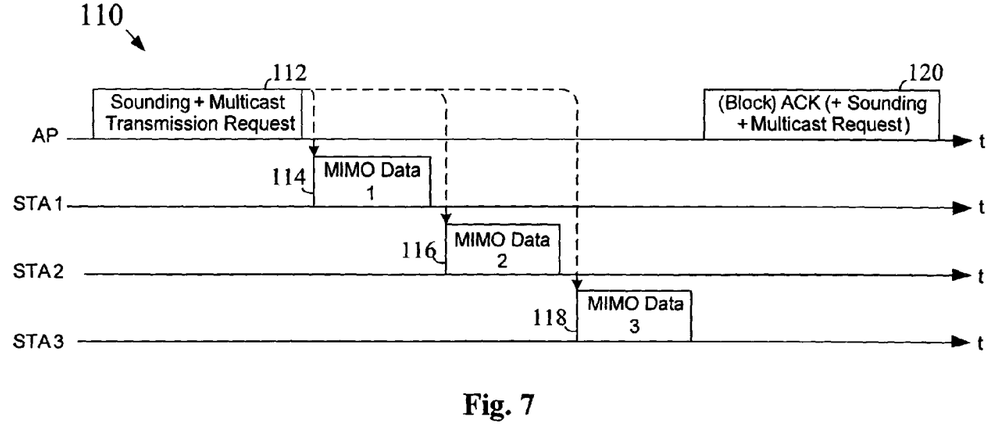
FIG. 7 is a timing diagram illustrating an example packet exchange sequence for performing uplink sounding in a implicit feedback network in accordance with an embodiment of the present invention.

FIG. 7 is a timing diagram illustrating an example packet exchange sequence 110 for performing uplink sounding using implicit feedback in accordance with an embodiment of the present invention. A group of STAs is first selected to transmit data to the AP. Any selection technique may be used. The AP then transmits a sounding packet 112 that can be used by all of the selected STAs. In addition to sounding symbols, the sounding packet 112 may also include a multicast transmission request that identifies the STAs that are to transmit data to the AP. The sounding packet 112 may also include ordering information specifying an order in which the selected STAs are to transmit data packets. The selected STAs receive the sounding packet 112 and determine that they are identified within the transmission request. The selected STAs then generate beamforming matrices using the sounding symbols. The beamforming matrices are then used by the selected STAs to transmit beamformed data packets 114, 116, 118 to the AP in the specified order. After all of the data packets 114, 116, 118 have been successfully received, the AP may transmit a block ACK packet 120 acknowledging the receipt. The block ACK packet 120 may include sounding and a multicast request for a subsequent set of uplink data transmissions (not shown). The process may then repeat.

Figure 8:
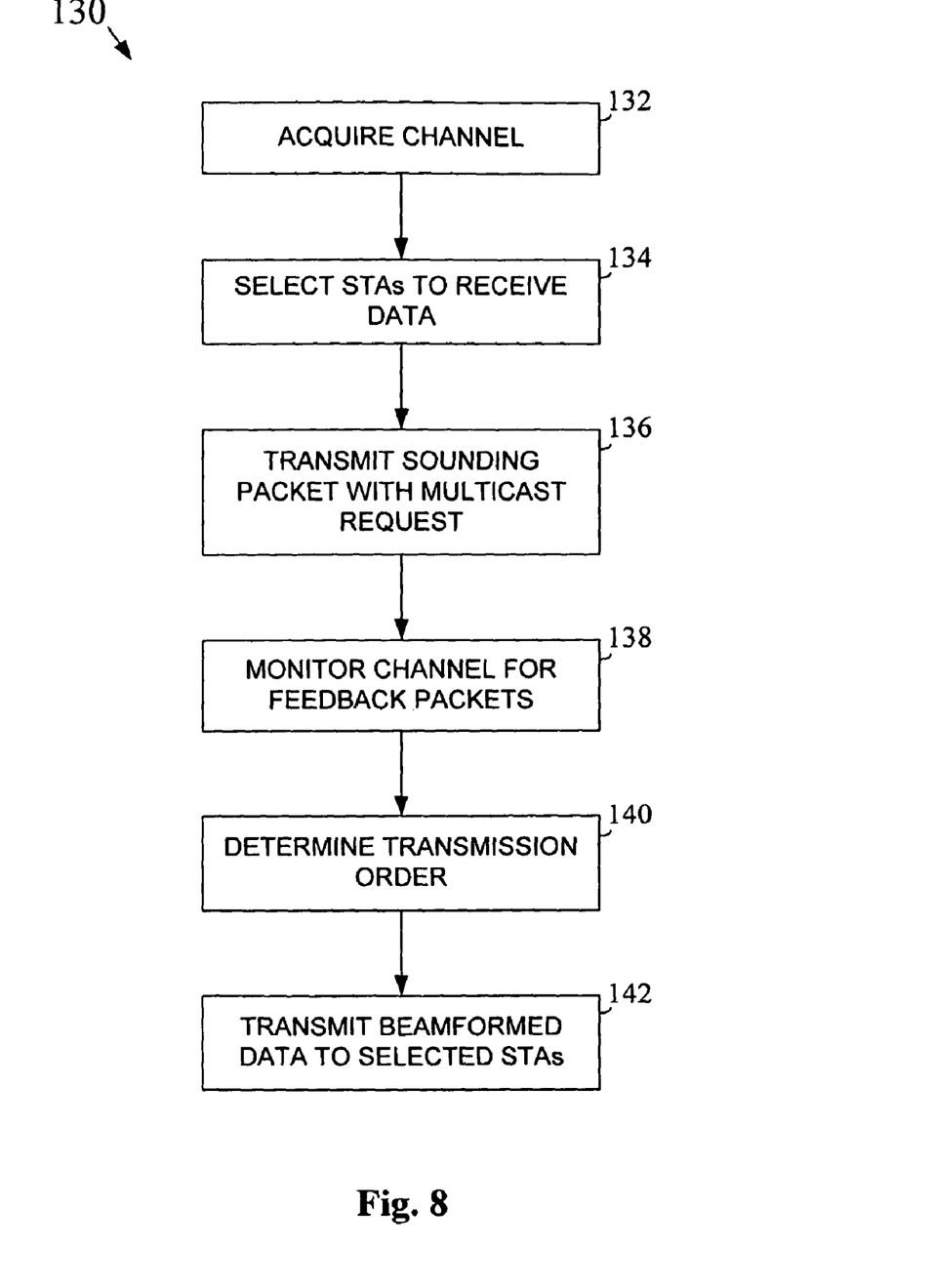
FIG. 8 is a flowchart illustrating an example method for training MIMO channels for data transmission to multiple STAs in an explicit feedback arrangement in accordance with an embodiment of the present invention.

FIG. 8 is a flowchart illustrating an example method 130 for training MIMO channels for data transmission to multiple STAs in an explicit feedback arrangement in accordance with an embodiment of the present invention. The method 130 may be practiced by an AP or another STA (e.g., in an ad hoc mode of operation). For example, the method 130 may be implemented within the controller 18 of AP 12 of FIG. 1 or in a controller of another device or component. In the discussion that follows, it will be assumed that an AP is implementing the method 130. First, a channel is acquired for transmission (block 132). A group of STAs is then selected to receive data (block 134). A sounding packet is transmitted that includes a multicast request (block 136). The multicast request identifies the selected STAs that are to receive data. The selected STAs use sounding symbols within the sounding packet to generate corresponding beamforming matrices for the downlink channel. The selected STAs then transmit feedback packets to the AP that include the corresponding beamforming matrices. In at least one embodiment, the multicast request indicates an order in which the feedback packets are to be returned. The AP monitors a receive channel for the feedback packets (block 138). Once the feedback packets have been received, an order is determined for transmitting data to the selected STAs (block 140). The order may be determined based upon factors such as, for example, the amount of data to be transmitted to each STA and the rate of change of each corresponding downlink channel. Beamformed data is then transmitted to each of the selected STAs, in the appropriate order, using the corresponding beamforming matrices (block 142). If any of the beamforming matrices were compressed before being fed back, then those matrices should be uncompressed before use.

Figure 9:
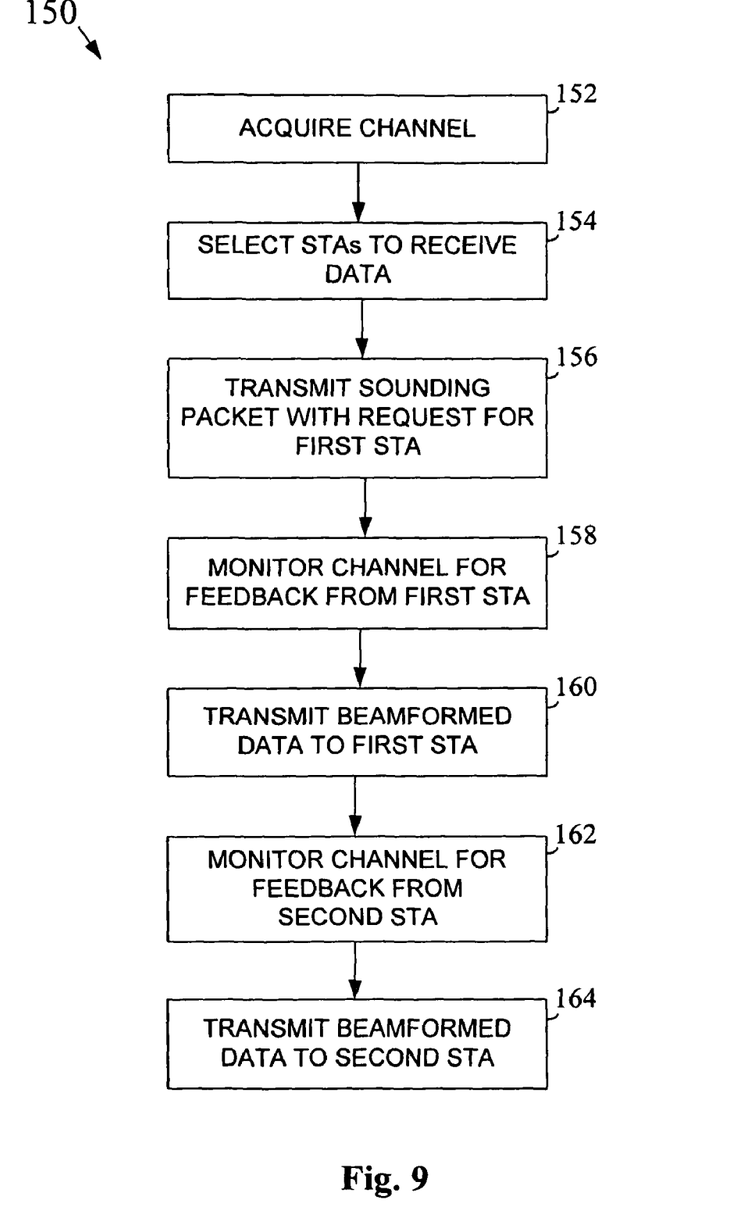
FIG. 9 is a flowchart illustrating another example method for training MIMO channels for data transmission to multiple STAs in an explicit feedback arrangement in accordance with an embodiment of the present invention.

FIG. 9 is a flowchart illustrating another example method 150 for training MIMO channels for data transmission to multiple STAs in an explicit feedback arrangement in accordance with an embodiment of the present invention. The method 150 may be practiced by an AP or a STA. For example, the method 150 may be implemented within the controller 18 of AP 12 of FIG. 1 or in a controller of another device or component. In the discussion that follows, it will be assumed that an AP is implementing the method 150. As before, a channel is first acquired for transmission (block 152). A group of STAs is then selected to receive data (block 154). A sounding packet is transmitted that includes a feedback request for a first selected STA (block 156). The feedback request identifies the first selected STA that is to receive data. The first selected STA uses sounding symbols within the sounding packet to generate a beamforming matrix for the corresponding downlink channel. The selected STA then returns a feedback packet that includes the beamforming matrix. The feedback request may indicate an offset at which the feedback packet is to be returned. The AP monitors a receive channel for the feedback packet from the first STA (block 158).

Once the feedback packet has been received, beamformed data is transmitted to the first STA using the beamforming matrix (block 160). If the beamforming matrix was compressed before being fed back, then the matrix should be uncompressed before use. Upon receiving the beamformed data, the first selected STA may transmit an acknowledgement packet. In at least one embodiment, the beamformed data packet transmitted to the first STA may include a feedback request for a second selected STA. When the second selected STA receives the beamformed data packet, it reads the feedback request and proceeds to generate a beamforming matrix for its downlink channel. This beamforming matrix may be generated using sounding symbols within the previous beamformed data packet. Alternatively, other information within the beamforming data packet may be used to generate the beamforming matrix (e.g., preamble, pilots, and/or data, as discussed previously) and dedicated sounding symbols are not required. After the beamforming matrix has been generated, the second STA may transmit the beamforming matrix back to the AP in a feedback packet.

In an alternative approach, the beamformed data packet transmitted to the first STA will not include a feedback request for the second selected STA. Instead, the second STA may have knowledge that data is buffered for it and will proactively generate and feed back a beamforming matrix for its downlink channel. This approach is feasible in situations where network traffic patterns are predictable (e.g., video or audio streaming, voice over IP, etc.).

The AP monitors its receive channel for the feedback packet from the second STA (block 162). When the feedback is received, it may be uncompressed if required. The feedback packet will also need to be matrix multiplied by the previously used beamforming matrix to generate the actual beamforming matrix for the corresponding downlink channel. Beamformed data is then transmitted to the second selected STA using the actual beamforming matrix (block 164). The above described process may then be repeated for a third selected STA (and possibly others). Alternatively, it can be repeated for the first selected STA (or be terminated) if there are only two selected STAs. The beamformed data packet transmitted to the second selected STA may also include a feedback request for the next STA to receive data.

Figure 10:
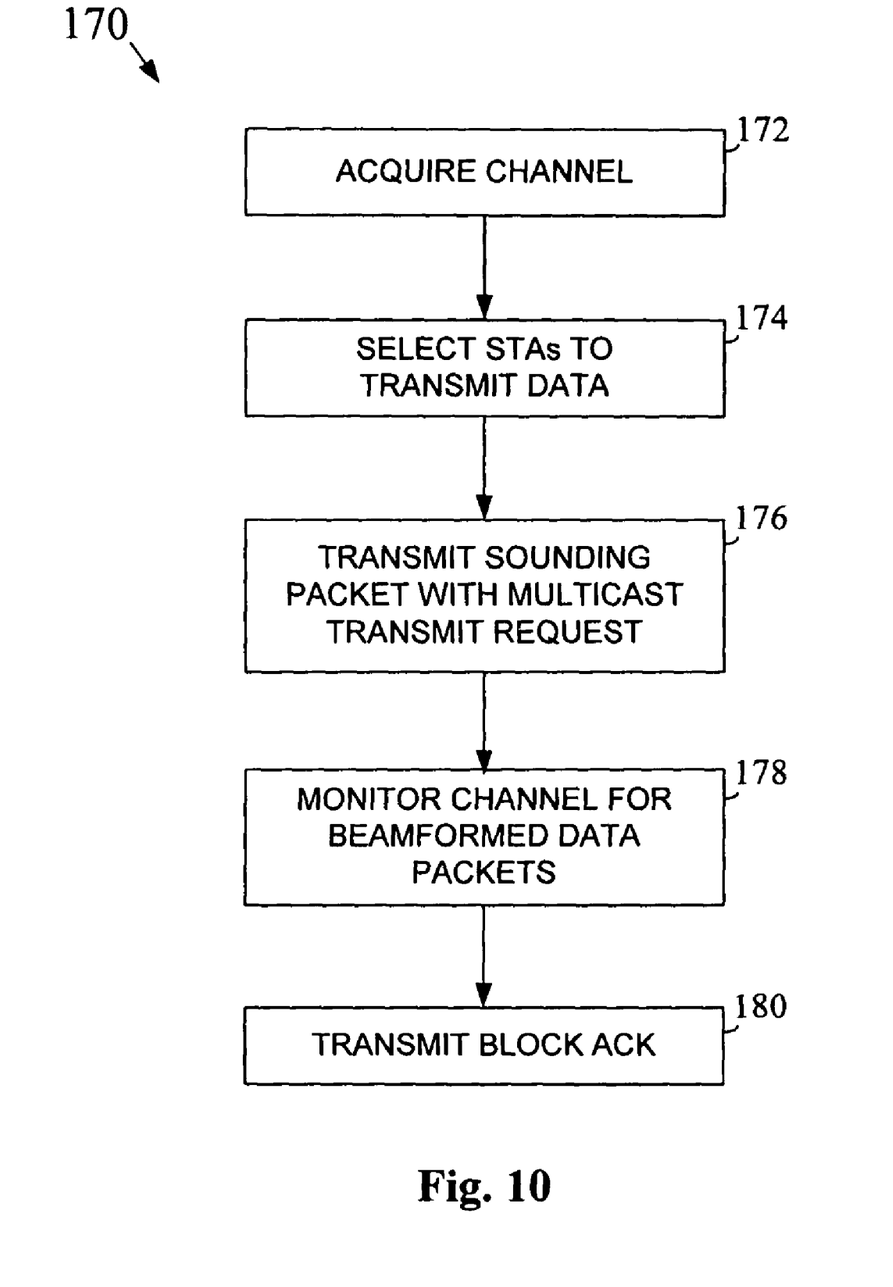
FIG. 10 is a flowchart illustrating an example method for training MIMO channels for data transmission from multiple STAs in an implicit feedback arrangement in accordance with an embodiment of the present invention.

FIG. 10 is a flowchart illustrating an example method 170 for training MIMO channels for data transmission from multiple STAs in an implicit feedback arrangement in accordance with an embodiment of the present invention. The method 170 may be practiced by an AP or a STA. For example, the method 170 may be implemented within the controller 18 of AP 12 of FIG. 1 or in a controller of another device or component. In the discussion that follows, it will be assumed that an AP is implementing the method 170. As described previously, the sounding for the uplink in an implicit feedback arrangement is similar to the sounding for the downlink in an explicit feedback arrangement. Referring to FIG. 10, a channel is first acquired for transmission (block 172) and a group of STAs is selected to transmit data (block 174). A sounding packet is transmitted that includes a multicast transmit request (block 176). The multicast transmit request identifies the selected STAs that are to transmit data to the AP. The selected STAs use sounding symbols within the sounding packet to generate beamforming matrices for the corresponding uplink channels. The selected STAs then generate and transmit beamformed data packets using the corresponding beamforming matrices. In at least one embodiment, the multicast transmit request indicates an order in which the beamformed data packets are to be transmitted. The AP monitors its receive channel for the beamformed data packets (block 178). After the data packets have been successfully received, the AP may transmit a block ACK packet to the selected STAs to acknowledge the successful receipt (block 180). Instead of a block ACK, a series of single user ACKs may be employed.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a block diagram are implemented in software within a digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
    transmitting a channel sounding packet from a first location, via multiple antennas, said channel sounding packet including: (a) identification information identifying multiple wireless communication devices that are each to generate a beamforming matrix in response to said channel sounding packet, and (b) an order in which said multiple wireless communication devices are to return packets to said first location in response to said channel sounding packet, said packets to include corresponding beamforming matrices;
    monitoring a receiver for the arrival of said packets from said multiple wireless communication devices;
    receiving said feedback packets in said receiver;
    determining a transmit order in which to transmit data to said multiple wireless communication devices, wherein determining a transmit order includes determining said transmit order based at least upon a channel variation speed associated with each of said multiple wireless communication devices; and
    using said beamforming matrices in said feedback packets to transmit beamformed data to corresponding wireless communication devices, in said transmit order, via said multiple antennas;
    wherein said identification information is part of a multicast transmit request within said channel sounding packet, said multicast transmit request requesting said multiple wireless communication devices to each return a beamformed data packet to said first location, said beamformed data packet to be generated using a corresponding beamforming matrix;
    wherein monitoring a receiver includes monitoring said receiver for the arrival of said beamformed data packets from said multiple wireless communication devices;
    wherein said method further comprises:
        receiving said beamformed data packets in said receiver; and
        transmitting a block acknowledgement (ACK) packet to said multiple wireless communication devices to acknowledge the successful receipt of said beamformed data packets, wherein said block ACK packet includes a second multicast transmit request for a subsequent group of data transmissions from wireless communication devices.

2. The method of claim 1, wherein:
said identification information is part of a multicast feedback request within said channel sounding packet, said multicast feedback request requesting said multiple wireless communication devices to each return a feedback packet to said first location that includes a corresponding beamforming matrix.

3. The method of claim 2, wherein:
monitoring a receiver includes monitoring said receiver for the arrival of said feedback packets from said multiple wireless communication devices.

4. The method of claim 1, wherein:
at least one of said received feedback packets includes a recommendation for a modulation and coding scheme (MCS) to be used to transmit data to a corresponding wireless communication device.

5. The method of claim 1, wherein:
said channel sounding packet further includes information identifying a modulation and coding scheme (MCS) that should be used to transmit data.

6. An apparatus comprising:
a wireless transceiver to support wireless communication with remote wireless entities; and
a controller to manage communication activity for the apparatus, said controller including logic to:
    generate a channel sounding packet for transmission from said wireless transceiver that includes: (a) identification information identifying multiple wireless communication devices that are each to generate a beamforming matrix in response to said channel sounding packet, and (b) an order in which said multiple wireless communication devices are to return packets to said apparatus in response to said channel sounding packet;
    monitor a receiver of said wireless transceiver for the arrival of said packets from said multiple wireless communication devices;
    receive said feedback packets in said transceiver;
    determine a transmit order in which to transmit data to said multiple wireless communication devices, wherein said operation to determine a transmit order includes operation to determine said transmit order based at least upon an amount of data to be transmitted to each of said multiple wireless communication devices; and use said beamforming matrices in said feedback packets to transmit beamformed data to corresponding wireless communication devices, in said transmit order, via said multiple antennas;

wherein said identification information is part of a multicast transmit request within said channel sounding packet, said multicast transmit request requesting said multiple wireless communication devices to each return a beamformed data packet to said first location, said beamformed data packet to be generated using a corresponding beamforming matrix;

wherein said logic to monitor said receiver includes logic to monitor said receiver for the arrival of said beamformed data packets from said multiple wireless communication devices;

wherein said controller further includes logic to:

receive said beamformed data packets in said transceiver; and transmit a block acknowledgement (ACK) packet to said multiple wireless communication devices to acknowledge the successful receipt of said beamformed data packets, wherein said block ACK packet includes a second multicast transmit request for a subsequent group of data transmissions from wireless communication devices.

7. The apparatus of claim 6, wherein:
said identification information is part of a multicast feedback request within said channel sounding packet, said multicast feedback request requesting said multiple wireless communication devices to each return a feedback packet to said first location that includes a corresponding beamforming matrix.

8. The apparatus of claim 6, wherein:
said identification information is part of a multicast transmit request within said channel sounding packet, said multicast transmit request requesting said multiple wireless communication devices to each return a beamformed data packet to said first location, said beamformed data packet to be generated using a corresponding beamforming matrix.

9. A system comprising:
a plurality of antennas, said plurality of antennas including at least one dipole antenna,
a wireless transceiver, coupled to said plurality of antennas, to support wireless communication with remote wireless entities; and
a controller to manage communication activity for the system, said controller including logic to:
generate a channel sounding packet for transmission from said wireless transceiver that includes: (a) identification information identifying multiple wireless communication devices that are each to generate a beamforming matrix in response to said channel sounding packet, and (b) an order in which said multiple wireless communication devices are to return packets to said system in response to said channel sounding packet;
monitor a receiver of said wireless transceiver for the arrival of said packets from said multiple wireless communication devices;
receive said feedback packets in said transceiver;
determine a transmit order in which to transmit data to said multiple wireless communication devices, wherein determining a transmit order includes determining said transmit order based at least upon a channel variation speed associated with each of said multiple wireless communication devices; and use said beamforming matrices in said feedback packets to transmit beamformed data to corresponding wireless communication devices, in said transmit order, via said multiple antennas;

wherein said identification information is part of a multicast transmit request within said channel sounding packet, said multicast transmit request requesting said multiple wireless communication devices to each return a beamformed data packet to said first location, said beamformed data packet to be generated using a corresponding beamforming matrix;

wherein said logic to monitor said receiver includes logic to monitor said receiver for the arrival of said beamformed data packets from said multiple wireless communication devices;

wherein said controller further includes logic to:

receive said beamformed data packets in said transceiver; and transmit a block acknowledgement (ACK) packet to said multiple wireless communication devices to acknowledge the successful receipt of said beamformed data packets, wherein said block ACK packet includes a second multicast transmit request for a subsequent group of data transmissions from wireless communication devices.

10. The system of claim 9, wherein:
said identification information is part of a multicast feedback request within said channel sounding packet, said multicast feedback request requesting said multiple wireless communication devices to each return a feedback packet to said first location that includes a corresponding beamforming matrix.

11. The system of claim 9, wherein:
said identification information is part of a multicast transmit request within said channel sounding packet, said multicast transmit request requesting said multiple wireless communication devices to each return a beamformed data packet to said first location, said beamformed data packet to be generated using a corresponding beamforming matrix.

12. An article comprising a storage medium having instructions stored thereon that, when executed by a computing platform, operate to:
generate a channel sounding packet including: (a) identification information identifying multiple wireless communication devices that are each to generate a beamforming matrix in response to said channel sounding packet, wherein said identification information is part of a multicast transmit request within said channel sounding packet, said multicast transmit request requesting said multiple wireless communication devices to each return a beamformed data packet to said first location, said beamformed data packet to be generated using a corresponding beamforming matrix, and (b) an order in which said multiple wireless communication devices are to return packets in response to said channel sounding packet;
cause said channel sounding packet to be transmitted via multiple antennas;
monitor a receiver for the arrival of said beamformed data packets from said multiple wireless communication devices;
receive said beamformed data packets in said receiver; and transmit a block acknowledgement (ACK) packet to said multiple wireless communication devices to acknowledge the successful receipt of said beamformed data packets, wherein said block ACK packet includes a second multicast transmit request for a subsequent group of data transmissions from wireless communication devices.

13. The article of claim 12, wherein:
said identification information is part of a multicast feedback request within said channel sounding packet, said multicast feedback request requesting said multiple wireless communication devices to each return a feedback packet that includes a corresponding beamforming matrix.

14. The article of claim 12, wherein:
said identification information is part of a multicast transmit request within said channel sounding packet, said multicast transmit request requesting said multiple wireless communication devices to each return a beamformed data packet, said beamformed data packet to be generated using a corresponding beamforming matrix.

15. A method comprising:
transmitting a channel sounding packet from a first location, via multiple antennas, said channel sounding packet including a feedback request requesting a first wireless communication device to generate a first beamforming matrix or CSI using said channel sounding packet and to feed back said first beamforming matrix or CSI to said first location;
receiving a feedback packet from said first wireless communication device that includes said first beamforming matrix or CSI;
transmitting a beamformed data packet to said first wireless communication device using said first beamforming matrix or CSI from said feedback packet; and
receiving a feedback packet from a second wireless communication device that includes a second beamforming matrix or CSI, said second beamforming matrix or CSI having been generated within said second wireless communication device using said beamformed data packet transmitted to said first wireless communication device.

16. The method of claim 15, wherein:
said beamformed data packet transmitted to said first wireless communication device includes a feedback request requesting said second wireless communication device to generate said second beamforming matrix or CSI using said beamformed data packet and to feed back said second beamforming matrix or CSI to said first location.

17. The method of claim 15, wherein:
said second beamforming matrix or CSI was generated by said second wireless communication device and fed back to said first location without a feedback request, said second wireless communication device having knowledge, before generating said second beamforming matrix or CSI, that data exists at said first location that needs to be transmitted to said second wireless communication device.

18. The method of claim 15, further comprising:
matrix multiplying said first beamforming matrix and said second beamforming matrix to achieve a third beamforming matrix; and
transmitting a second beamformed data packet to said second wireless communication device using said third beamforming matrix.

19. The method of claim 18, wherein:
said second beamformed data packet that is transmitted to said second wireless communication device includes a feedback request requesting a third wireless communication device to generate a fourth beamforming matrix using said second beamformed data packet and to feed back said fourth beamforming matrix to said first location.

20. The method of claim 15, wherein:
said second wireless communication device uses at least one of the following from said beamformed data packet to generate said second beamforming matrix: a preamble, beacons, pilots, and user data.

* * * * *